United States Patent [19]
McCloskey

[11] 3,887,246

[45] June 3, 1975

[54] ANTI-FRICTION BALL BEARING ASSEMBLY

[75] Inventor: Albert R. McCloskey, Fairfield, Conn.

[73] Assignee: Rockwell International Corporation, Pittsburgh, Pa.

[22] Filed: Jan. 17, 1974

[21] Appl. No.: 434,355

[52] U.S. Cl. ............................................. 308/6 C
[51] Int. Cl. ......................................... F16c 17/16
[58] Field of Search ........... 308/6 R, 6 B, 6 C, 173, 308/174, 175, 176, 216, 235; 220/402.16

[56] References Cited
UNITED STATES PATENTS
3,709,410   1/1973   Cunningham .................. 220/402.16
3,767,276   10/1973  Henn .................................. 308/6 C

*Primary Examiner*—M. Henson Wood, Jr.
*Assistant Examiner*—Gene A. Church

[57] ABSTRACT

An anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a longitudinal fracture line such that said outer sleeve acts as a biasing means on said balls to effect a preloaded force between said shaft and said balls and said outer sleeve.

8 Claims, 4 Drawing Figures

PATENTED JUN 3 1975   3,887,246
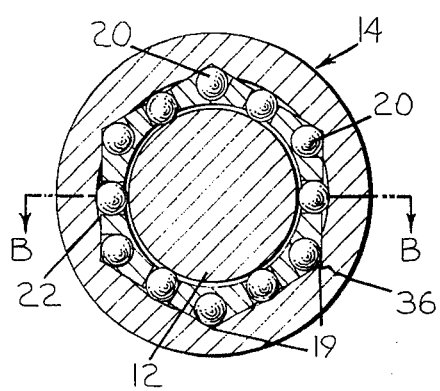
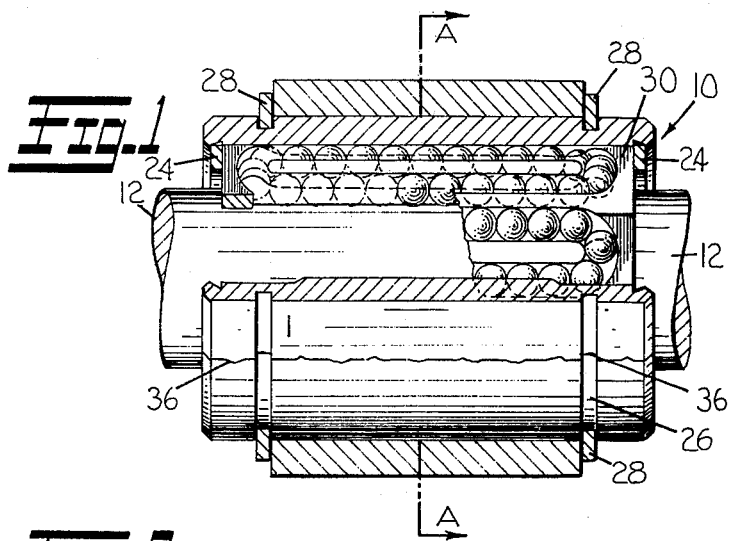
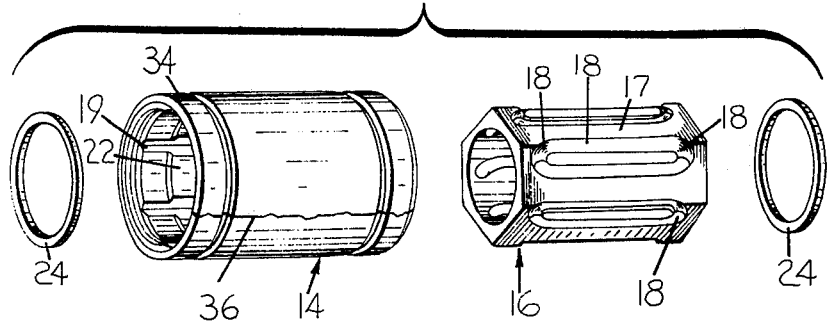
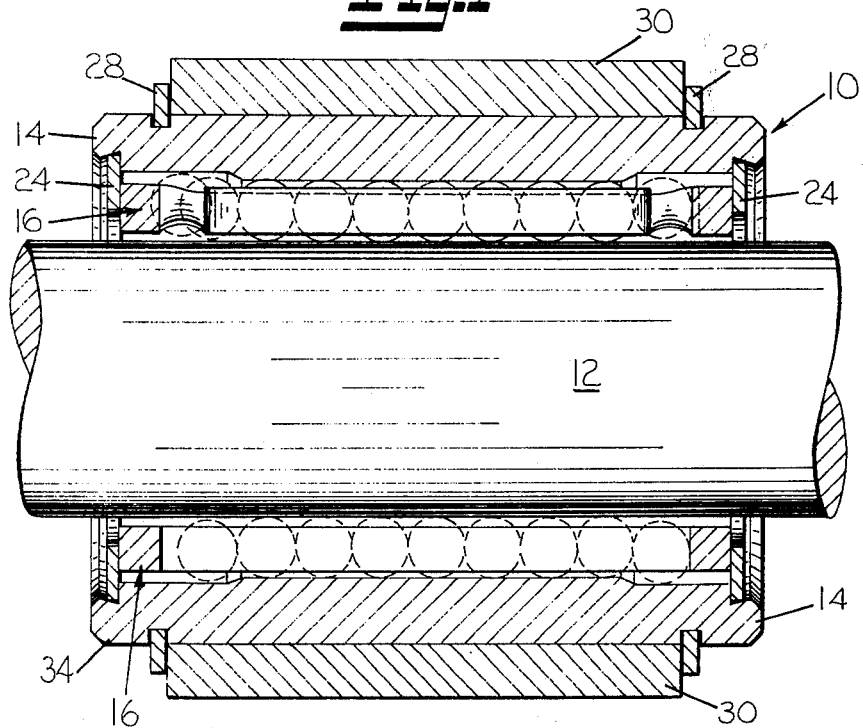

ANTI-FRICTION BALL BEARING ASSEMBLY

BACKGROUND OF THE INVENTION

This invention relates to a ball bearing assembly adapted to move longitudinally along a circular shaft. In particular, the invention relates to a anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a longitudinal fracture line such that said outer sleeve acts as a biasing means on said balls to effect a preloaded force between said shaft and said balls and said outer sleeve.

The prior art is replete with recirculating ball bearing assemblies. Typical prior art forms of bearings of this type fail to provide a precise and controlled relationship with shaft upon which is mounted. This bearing "play" or slopiness could result in misalignment of the various component parts of the system in which the ball bearing assembly is incorporated. This can be critical in optical transport systems such as found in copying machines, where bearing play will cause optical misalignment thereby causing poor quality copies. The prior art has attempted to accommodate such requirements by the provision of machined grooves or slots which can result in the actual loss or spillage of the balls particularly in the smaller sized bearings where there may be a crouching of the ball tracks and ball return grooves.

SUMMARY OF THE INVENTION

Accordingly, it is a primary object of this invention to provide an anti-friction ball bearing assembly, adapted for mounting within a housing comprising an outer sleeve and an inner sleeve concentrically fitting within said outer sleeve, a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a longitudinal fracture line such that said outer sleeve acts as a biasing means on said balls to effect a preloaded force between said shaft and said balls and said outer sleeve.

It is another object of this invention to provide an anti-friction ball bearing assembly which is particularly adapted to provide precise and controlled linear bearing support and transport of device and apparatus with fine tolerances.

It is still another object of the present invention to provide a highly efficient ball bearing assembly which is capable of being inexpensively manufactured and being simplistic in design.

It is still another object of the present invention to provide an anti-friction ball bearing assembly which can be manufactured using high volume automated techniques.

It is yet another object of the present invention to provide an anti-friction ball bearing assembly in which outer sleeve acts as a spring member to effect a preloaded force on the support shaft.

Other objects of the present invention and details of the structure of the anti-friction ball bearing assembly will appear more fully from the following description and accompanying drawings.

DESCRIPTION OF THE DRAWINGS

The accompanying drawings, referred herein and constituting a part hereof, illustrate an embodiment of the invention, and together with the description, serve to explain the principles of the invention.

In the drawings:

FIG. 1 is a side elevation view, partially cut away, of a ball bearing assembly embodying the invention mounted on a shaft;

FIG. 2 is an end section taken along the line A—A of FIG. 1;

FIG. 3 is an exploded perspective view of part of the assembly of FIG. 1 with the anti-friction balls removed;

FIG. 4 is a sectional view taken along the line B—B of FIG. 2.

DETAIL DESCRIPTION OF THE INVENTION

Referring now to the drawings, there is shown an improved anti-friction ball bearing assembly embodying the concept of the present invention wherein the anti-friction ball bearing assembly is generally designated by the numeral 10. The anti-friction ball bearing assembly 10 is particularly adapted for being mounted, for linear translation thereon, on a shaft 12. The anti-friction ball bearing assembly 10 is provided with an outer sleeve 14 and an inner sleeve 16. The outer surface of the inner sleeve 16 may be polyhedronal in shape and may have a number of axially extending planar surfaces 17.

The inner sleeve 16 is further provided with a number of closed loop tracks 18 which define paths with circulation of load carrying balls 20. The inner surface of the outer sleeve 14 may also be polyhedronal in shape. The inner surface of the outer sleeve 14 has a number of axially extending planar surfaces 19. The shape of the inner surface of the outer sleeve 14 generally conforms to the shape of the outer surface of the inner sleeve 16. The outer surface of the inner sleeve 16 therefore may be placed in registration with the inner surface of the outer sleeve at their respective axially extending planar surfaces.

A plurality of axially extending bearing raceways 22 are provided on the inner surface of the outer sleeve 14.

The retaining means such as snap rings 24 are provided at each end of the anti-friction ball bearing assembly 10 to positionally anchor the inner sleeve 16 in the outer sleeve 14 to thereby maintain the operational integrity of the anti-frictional ball bearing assembly 10. The snap rings 24 therefor maintain the axial position of the inner sleeve 16 with respect to the outer sleeve 14 while the aforementioned registration of the axially extending planar surfaces of the inner sleeve 16 and the outer sleeve 14 maintain the radial position of the inner sleeve 16 with respect to the outer sleeve 14.

The outer sleeve 14 generally embodies and contains the critical departure from the prior art forms of linear bearings. It can be seen from the various figures that the outer sleeve 14 contains a fracture or line 36 which longitudinally extends throughout the entire length of the outer sleeve 14. This longitudinally extending fracture line 35 also extends in a radial direction, completely through the outer sleeve 14.

This fracture line 36 comprises a critical departure prior art form of linear bearings in that by the provision of the fracture 36 the outer sleeve 14 becomes inherently a natural spring like member. The prior art forms of linear bearings involve the use of a milled or sawed groove running longitudinally and radially through the wall of the outer sleeve. This prior art approach requires the use of lock nuts or the like to apply a preloading force to the overall bearing assembly. This approach is particularly objectionable on bearings with a large number of crowded ball tracks. Under this situation the balls of the prior art bearing will tend to spill out under certain load conditions. This is occasioned particularly in small bearings such as bearings having a 3/8 inch diameter shaft. The present invention requires no such loading or lock nuts and is highly adaptable to small linear bearing applications.

The fracture line 36 can be generated in a number of ways and the outer sleeve 14 can be made from a number of suitable materials. One example might include an outer sleeve 14 manufactured through hardened material such as S.A.E. 52100 steel, heat treated to RC 60/63. The method of fracturing might include the grinding or milling of a small groove at a point at or near the intersection 19 of the planes defined by the axially extending planar surfaces generated on the inner surface of the outer sleeve 14. It might be said that the point 19 is at a stress riser. A tapered tool such as a punch with no cutting edges or the like may be placed snuggly inside the inner surface of the outer sleeve until it butts up and is firmly lodged therein. The next step simply involves the sharp rapping or blow by a hammer or like tool to the area directly above point 19. This rap or blow will result in a fracture line 36. Obviously other suitable means of generating this line can be utilized. Referring now to the outer surface of the outer sleeve 14 there is provided annular grooves 26. These annular grooves 26 are adapted to receive retaining means such as snap rings 28.

The snap rings 28 axially position the anti-friction ball bearing assembly 10 within housing 30. The housing 30 which is substantially cylindrical in shape is the means by which the anti-friction ball bearing assembly 10 is operationally connected to a machine element device, apparatus or the like such as a tooling fixture, etc. (not shown). The housing 30 (or sometimes referred to as a bushing) is attached to such machine element, etc., by an appropriate attaching means (not shown) such as a set screw, press fit or the like. A typical example of housings 30 can be found in ROCKWELL INTERNATIONAL CORPORATION'S catalog LB-2. These products are marketed under Rockwell International Corporation's trademark UNILIN.

As before noted and discussed the outer sleeve 14 is provided with a fracture line 36 at or near point 19. When a biasing force is directed against the inner surface of the outer sleeve 14 the outer sleeve 14 will act as a natural spring and the spring action will tend to resist this force. A number of means or methods can become employed to generate this biasing or preloading force. The method can be generally characterized as by providing some type of interference fit between the shaft 12, the ball 20 and the inner surface of the sleeve 14. One approach might include the provision of an oversized shaft 12. That is, the outer diameter could be slightly larger than that typically used, the standard type linear bearing. For example, the diameter might be 0.005 inches larger than the so-called standard size shaft. This increase in the size of the diameter would result in a slight interference fit between the outer surface of the shaft and the balls 20. This interference fit will generate a preloaded force transmitted to the inner surface of the outer sleeve 14 and will be accommodated by the natural spring action caused by the fracture line 36.

Further, the balls 20 could be slightly oversized to generate in a like manner this interference fit. Additionally, the ball tracks 22 could be ground or generated slightly undersized and in a similar fashion this will generate the interference fit and attendant preloading force. Obviously, any combination or permutation of the above noted means could be employed to generate the desired interference fit and preloading force.

As before noted a primary result of this interference fit and preloading force is to enable the bearing assembly 10 to transport the associated apparatus to which it is attached (not shown) through the housing 30 in a precise and controlled manner. This can be particularly important in the transport of optical systems and the like.

It is important to note that while only one fracture line 36 is shown in FIGS. 1 through 4, it is obviously within the scope of the present invention to provide a multiplicity of such fracture lines 36. In such a configuration, that is, an outer sleeve 14 with a multiplicity of fracture lines 36, the bearing assembly 10 could be resiliently mounted in a housing. For example, a resilient liner, such as deformable "O" rings, plastic material, or the like, may be provided between the outer surface of the outer sleeve 14 and the inner surface of the housing 30. Additionally, a resilient means could be provided between the outer surface of the housing 30 and the apparatus or device to which such housing may be attached (not shown).

It is therefore, obvious, that the present invention is not to be limited to the specific details as herein described, but is capable of other modifications and changes without departing from the spirit and scope of the appended claims.

I claim:

1. An anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a longitudinal fracture line such that said outer sleeve acts as a biasing means on said balls to effect a preloaded force between said shaft and said balls and said outer sleeve.

2. Anti-friction ball bearing assembly in accordance with claim 1 wherein said preloaded force is generated by interference fit between said shaft, said balls and inner surface of said outer sleeve.

3. Anti-friction ball bearing assembly in accordance with claim 2 wherein said shaft is slightly oversized to cause an interference fit.

4. Anti-friction ball bearing assembly in accordance with claim 2 wherein said balls are slightly oversized to cause an interference fit.

5. Anti-friction ball bearing assembly in accordance with claim 2 wherein said inner surface of said outer sleeve is sized slightly undersize.

6. Anti-friction ball bearing assembly in accordance with claim 1 wherein there is a single fracture line.

7. Anti-friction ball bearing assembly in accordance with claim 1 wherein there are a plurality of fracture lines.

8. Anti-friction ball bearing assembly in accordance with claim 7 wherein there is further provided a resilient member between the outer surface of said outer sleeve and said inner surface of said housing.

* * * * *